(12) United States Patent
Ouspenski

(10) Patent No.: US 8,871,115 B2
(45) Date of Patent: Oct. 28, 2014

(54) PROCESS OF FORMING A LUMINESCENT MATERIAL

(71) Applicant: Vladimir Ouspenski, Saint-Pierre les Nemours (FR)

(72) Inventor: Vladimir Ouspenski, Saint-Pierre les Nemours (FR)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 75 days.

(21) Appl. No.: 13/684,445

(22) Filed: Nov. 23, 2012

(65) Prior Publication Data

US 2013/0175475 A1 Jul. 11, 2013

Related U.S. Application Data

(60) Provisional application No. 61/584,490, filed on Jan. 9, 2012.

(30) Foreign Application Priority Data

Nov. 24, 2011 (FR) ..................................... 11 60738

(51) Int. Cl.
*C09K 11/08* (2006.01)
*C09K 11/77* (2006.01)

(52) U.S. Cl.
CPC ......... *C09K 11/7774* (2013.01); *C09K 11/7772* (2013.01); *C09K 11/7789* (2013.01)
USPC ....... 252/301.4 H; 252/301.4 S; 252/301.6 S; 252/301.4 R; 252/301.6 R; 252/301.4 F; 252/301.6 F; 252/301.5; 252/301.4 P; 252/301.6 P; 264/21

(58) Field of Classification Search
USPC ....................... 252/301.4 R–301.6 P; 372/41; 250/370.11, 363.02, 363.04; 264/21
See application file for complete search history.

(56) References Cited

U.S. PATENT DOCUMENTS

| | | | | | |
|---|---|---|---|---|---|
| 3,249,552 | A | * | 5/1966 | Lehmann | 252/301.6 S |
| 3,940,347 | A | * | 2/1976 | Faria et al. | 252/301.5 |
| 4,857,228 | A | * | 8/1989 | Kabay et al. | 252/301.4 S |
| 6,960,309 | B2 | * | 11/2005 | Aoki et al. | 252/301.4 R |
| 7,151,261 | B2 | * | 12/2006 | Chai | 250/362 |
| 7,166,845 | B1 | * | 1/2007 | Chai | 250/361 R |
| 7,208,102 | B2 | * | 4/2007 | Aoki et al. | 252/301.4 R |
| 7,863,572 | B1 | | 1/2011 | Doty | |
| 2008/0067391 | A1 | | 3/2008 | Shimizu et al. | |
| 2009/0009059 | A1 | | 1/2009 | Kwon et al. | |
| 2012/0305778 | A1 | * | 12/2012 | Menge et al. | 250/361 R |
| 2013/0327986 | A1 | * | 12/2013 | Blahuta et al. | 252/301.4 S |

FOREIGN PATENT DOCUMENTS

| | | |
|---|---|---|
| EP | 0180602 B1 | 3/1989 |
| JP | 2001064643 A | 3/2001 |
| JP | 2003201473 A | 7/2003 |
| KR | 20090004179 A | 1/2009 |
| WO | WO 85/04892 | * 11/1985 |

OTHER PUBLICATIONS

Spurrier et al, "The effect of co-doping on the growth stability and scintillation properties of LSO:Ce", 15th International Conf. of Crystal Growth, Aug. 2007.*
Spurrier et al, "The effect of co-doping on the growth stability and scintillation properties of lutetium oxyorthosilicate", Jorn. Crystal Growth, 310, Nov. 2007, pp. 2110-2114.*
The International Search Report and the Written Opinion for International Application No. PCT/US2012/066459 received from the International Searching Authority (ISA/KR), dated Feb. 25, 2013, 12 pages.
Samuel Blahuta et al., "Defects Identification and Effects of Annealing on Lu2(1-X)Y2XSiO5(LYSO) Single Crystals for Scintillation Application," Materials, 2011, 4, 1224-1237; doi: 10.3390/ma4071224, ISSN 1996-1944, <www.mdpi.com/journal/materials>, Published Jul. 1, 2011, 14 pages.
M.J. Harrison et al., "Initial Investigation of Strengthening Agents for Lanthanide Halide Scintillators," Sandia National Laboratories, Proceedings of the SPIE, vol. 6707, 67070B, dated 2007, 10 pages.
M.A. Spurrier et al., "The effect of co-doping on the growth stability and scintillation properties of LSO:Ce," Siemens medical, 15th International Conference on Crystal Growth, Salt Lake City, Utah, USA, dated Aug. 2007, 1 page.
M.A. Spurrier et al., "The effect of co-doping on the growth stability and scintillation properties of lutetium oxyorthosilicate," Elsevier, ScienceDirect, <www.sciencedirect.com>, Journal of Crystal Growth 310, dated 2008, 5 pages.

* cited by examiner

*Primary Examiner* — Carol M Koslow
(74) *Attorney, Agent, or Firm* — Abel Law Group, LLP; Robert N. Young

(57) ABSTRACT

A luminescent material can be formed by a process using a vacancy-filling agent that includes vacancy-filling atoms. In an embodiment, the process can include forming a mixture of a constituent corresponding to the luminescent material and the vacancy-filling agent. The process can further include forming the luminescent material from the mixture, wherein the luminescent material includes at least some of the vacancy-filling atoms from the vacancy-filling agent. In another embodiment, the process can include melting a constituent corresponding to the luminescent material to form a melt and adding a vacancy-filling agent into the melt. The process can also include forming the luminescent material from the melt, wherein the luminescent material includes at least some of the vacancy-filling atoms from the vacancy-filling agent. The luminescent material may have one or more improved performance properties as compared to a corresponding base material of the luminescent material.

20 Claims, 1 Drawing Sheet

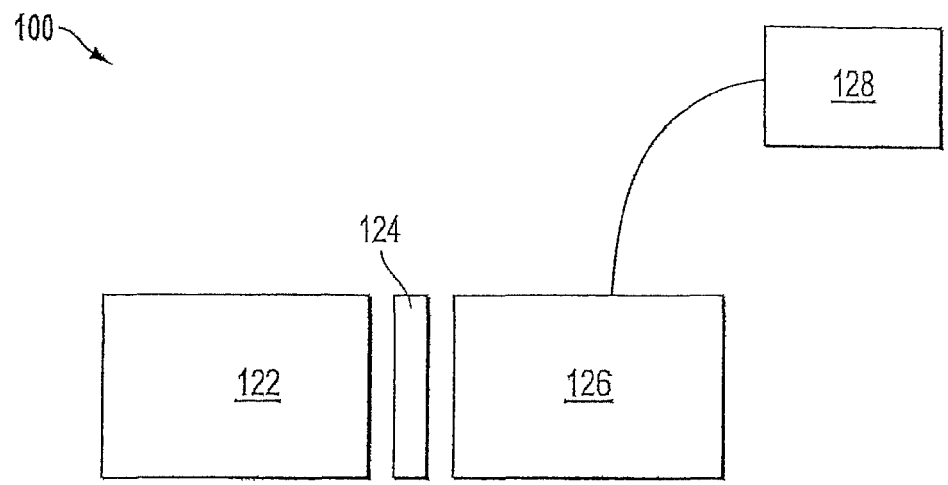

PROCESS OF FORMING A LUMINESCENT MATERIAL

CROSS-REFERENCE TO RELATED APPLICATIONS

This application claims priority under 35 U.S.C. §119(b) to French Patent Application No. 1160738 entitled "Luminescent Material and a Process of Forming the Same," by Ouspenski, filed Nov. 24, 2011, and under 35 U.S.C. §119(e) to U.S. Patent Application No. 61/584,490 entitled "Luminescent Material and a Process of Forming the Same," by Ouspenski, filed Jan. 9, 2012, both of which are assigned to the current assignee hereof and incorporated herein by reference in their entireties.

FIELD OF THE DISCLOSURE

The present disclosure is directed to luminescent materials, processes of forming them, and apparatuses having scintillators with such compounds.

RELATED ART

Scintillators can be used for medical imaging and for well logging in the oil and gas industry as well for the environment monitoring, security applications, and for nuclear physics analysis and applications. Scintillators include luminescent materials that include rare earth elements, wherein the rare earth element can be a dopant or as a principal constituent within the compound. Further improvement of luminescent materials is desired.

BRIEF DESCRIPTION OF THE DRAWINGS

Embodiments are illustrated by way of example and are not limited in the accompanying FIGURES.

FIG. 1 includes an illustration of an apparatus including a scintillator having a luminescent material in accordance with an embodiment.

Skilled artisans appreciate that elements in the FIGURES are illustrated for simplicity and clarity and have not necessarily been drawn to scale. For example, the dimensions of some of the elements in the FIGURES may be exaggerated relative to other elements to help to improve understanding of embodiments of the invention.

DETAILED DESCRIPTION

The following description in combination with the FIGURES is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

Before addressing details of embodiments described below, some terms are defined or clarified. Group numbers corresponding to columns within the Periodic Table of the Elements use the "New Notation" convention as seen in the CRC Handbook of Chemistry and Physics, 81$^{st}$ Edition (2000).

As used in this specification, color space is expressed in terms of L*, a*, and b* coordinates as specified by the Commission Internationale de l'éclairage ("CIE") 1976. The three coordinates represent the lightness of the color (L*=0 yields black and L*=100 indicates diffuse white; specular white may be higher), its position between red/magenta and green (a*, negative values indicate green while positive values indicate magenta) and its position between yellow and blue (b*, negative values indicate blue and positive values indicate yellow).

Boiling and sublimation temperatures are provided herein are at one atmosphere of pressure (approximately 101 kPa, absolute) unless explicitly stated otherwise.

The term "compound" is intended to mean a plurality of substantially similar molecules. When forming a boule including a substantially single crystal, the boule can have a single compound even though the molecular formula will slightly vary along the length of the boule due to segregation coefficients, hence the molecular formula is not perfectly homogeneous along the length of the boule. The term "material" is intended to mean a composition, regardless of form, that includes a compound and potentially atoms or molecules that are not part of the compound. Such atoms or molecules may be located at interstitial sites within a matrix of the compound or may be dissolved within the material.

The letter "M," when referring to a particular element within a compound, is intended to mean a metal element. For example, $M^{2+}$ is used to represent a divalent metal. $M^{3+}$ is used to represent a trivalent metal, which in an embodiment, may be a rare earth element, and in another embodiment, may be a trivalent metal other than a rare earth element, such as Al, Ga, Sc, In, or the like.

The term "principal constituent," when referring to a particular element within a compound, is intended to that the element is present as part of the molecular formula for the compound, as opposed to a dopant. A dopant within a compound is typically present at a concentration no greater than 5% atomic. As an example, Ce-doped $LaBr_3$ ($LaBr_3$:Ce) includes La and Br are principal constituents, and Ce is a dopant and not a principal constituent.

The term "rare earth" or "rare earth element is intended to mean Y, Sc, La, and the Lanthanides (Ce to Lu) in the Periodic Table of the Elements. In chemical formulas, a rare earth element is represented by "RE."

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillation and radiation detection arts.

A luminescent material can be formed using a vacancy-filling agent that can help to introduce vacancy-filling atoms into the luminescent material during formation, rather than solely relying on an ambient surrounding the luminescent material to provide vacancy-filling atoms. The use of the vacancy-filling agent in forming the luminescent material is substantially more effective at reducing the likelihood of forming vacancies within a finished luminescent material, as compared to relying solely on diffusing vacancy-filling atoms from an ambient surrounding the luminescent material. The use of the vacancy-filling agent can be particularly helpful for rare earth-containing luminescence materials, as such luminescent materials are relatively dense and have relatively low diffusion coefficients. The vacancy-filling agents can be used with other luminescent materials and are not limited to use with only rare earth-containing luminescent materials.

Luminescent materials formed using a vacancy-filling agent may have a higher light output, lower energy resolution, lower afterglow, better proportionality, shorter decay time or any combination thereof may be achieved, as compared to a corresponding luminescent material when a vacancy-filling agent is not incorporated within a melt or body during formation.

Processes of forming luminescent materials using vacancy-filling agents can start with selecting a vacancy-filling agent based on a desired luminescent material to be formed. The vacancy-filling agent can provide O, S, or X atoms, wherein X is a halogen. The vacancy-filling agent can be a compound that includes vacancy-filling atoms and other atoms that include an element different from an element of the vacancy-filling atoms. The other atoms are typically different from any of the atoms within a matrix of a luminescent compound within the luminescent material. The other atoms may include metal atoms that are not chemically bonded to other atoms that are principal constituents within the luminescent compound. In a particular embodiment, the metal atoms include Ba, Sn, Zn, Zr, Hf, Cd, Pb, or any combination thereof. In a finished luminescent material, the luminescent material may be substantially free of any of the other atoms or, to the extent that the luminescent material includes the other atoms, such other atoms may only be present at interstitial sites and not within the matrix of the luminescent compound. In another embodiment, the vacancy-filling agent can include the vacancy-filling atoms without any other atoms, and an example of such a vacancy-filling agent includes sulfur.

The amount of vacancy-filling agent may be determined based on the total mass of the starting materials. For a particular luminescent compound, an improvement in performance properties may become significant at a lower concentration and the performance properties may improve with increasing concentration. In a particular embodiment, the performance properties may be a linear function of concentration over a range of concentrations. At higher concentrations, the performance properties may become saturated and a further increase in concentration does not significantly further improve the performance properties. As an example, cerium-doped lutetium yttrium orthosilicate (LYSO:Ce) may start to show a significant improvement in performance properties starting at a concentration of 0.1 weight %, and the improvement can increase linearly to at least 0.5 weight %. At 1.0 weight % or 2 weight %, a further significant improvement may not be seen with increasing concentration. For cerium-doped lanthanum bromide ($LaBr_3$:Ce), the corresponding concentrations for the vacancy-filling agent can be less than for LYSO:Ce. $LaBr_3$:Ce may start to show a significant improvement in performance properties starting at a concentration of 0.001 weight %, and the improvement can increase linearly to 0.01 weight %. At 0.01 weight %, a further significant improvement may not be seen with increasing concentration.

In an embodiment, the vacancy-filling agent is at least approximately 0.0002 weight %, at least approximately 0.001 weight %, at least approximately 0.002 weight %, at least approximately 0.02 weight %, at least approximately 0.05 weight %, at least approximately 0.11 weight %, or at least approximately 0.3 weight % of a total mass of starting materials used to form the luminescent material. In another embodiment, the vacancy-filling agent is no greater than approximately 50 weight %, no greater than approximately 20 weight %, no greater than approximately 9 weight %, no greater than approximately 5 weight %, no greater than approximately 2 weight %, no greater than approximately 0.7 weight %, no greater than approximately 0.2 weight %, no greater than approximately 0.09 weight %, no greater than approximately 0.02, or no greater than 0.01 weight % of a total mass of starting materials used to form the luminescent material.

The vacancy-filling agents can be solid at room temperature (for example, approximately 20° C.) and allow for easier handling compared to gasses and liquids. The vacancy-filling agents can be added similar to any other starting material for a luminescent material. Thus, the use of vacancy-filling agents does not require significantly different handling or equipment as compared to other starting materials. Therefore, no or only minimal modifications would be made to an existing equipment setup or process flow. In another embodiment, the vacancy-filling agent may be in a liquid or gaseous state if needed or desired. The vacancy-filling agent may be part of a mixture of materials before a melt is formed, may be added after a melt is formed, or may be incorporated within a body before the body is sintered. Some considerations regarding vaporization temperatures are described below. The vaporization temperature at the formation pressure can refer to a sublimation point or a boiling point of the vacancy-filling agent. While many vacancy-filling agents will sublime, others may go from a solid phase to a liquid phase before boiling. Many luminescent materials can be formed from melts at or near atmospheric pressure. Other luminescent materials can be formed using a sintering step at pressure substantially higher than atmospheric pressure. Thus, a vacancy-filling agent that may not be suitable for formation at or near atmospheric pressure may be suitable for formation at a higher pressure, as the vaporization temperature of the vacancy-filling agent may be higher as the pressure increases.

The vacancy-filling agent can have a vaporization temperature that is within approximately 250° C. of the melting temperature of the luminescent material. In another embodiment, the vacancy-filling agent may have a vaporization temperature that is within approximately 200° C., within approximately 150° C., within approximately 90° C., within approximately 50° C., or within approximately 20° C. of the melting temperature of the luminescent material. In an embodiment, the vacancy-filling agent has a vaporization temperature above the melting temperature of the luminescent material. In a particular embodiment, the vaporization temperature of the vacancy-filling agent is at least approximately 5° C., at least approximately 11° C., at least approximately 20° C., at least approximately 50° C., or at least 105° C. higher than the melting temperature of the luminescent material. In another embodiment, the vacancy filling-agent has a vaporization temperature below the melting temperature of the luminescent material. In a particular embodiment, the vaporization temperature of the vacancy-filling agent is at least approximately 5° C., at least approximately 11° C., at least approximately 20° C., at least approximately 50° C., or at least 105° C. lower than the melting temperature of the luminescent material. In another embodiment, the vacancy-filling agent may have a vaporization temperature more than approximately 250° C. from the melting temperature of the luminescent material.

The luminescent material may be in the form of a ceramic body that is formed using a sintering operation at a sintering temperature and a sintering pressure. The vacancy-filling agent can have a vaporization temperature at the sintering pressure that is within approximately 250° C. of the sintering temperature. In another embodiment, the vacancy-filling agent may have a vaporization temperature at the sintering pressure that is within approximately 200° C., within approximately 150° C., within approximately 90° C., within approximately 50° C., or within approximately 20° C. of the sintering temperature. In an embodiment, the vacancy-filling agent has a vaporization temperature lower than the sintering temperature. In a particular embodiment, the vaporization temperature of the vacancy-filling agent at the sintering pressure is at least approximately 5° C., at least approximately 11° C., at least approximately 20° C., at least approximately 50° C., or at least 105° C. lower than the sintering temperature. In another embodiment, the vacancy-filling agent may have a vaporization temperature more than approximately 250° C. from the sintering temperature.

The vacancy-filling agent may be combined with a constituent corresponding to the luminescent material to form a mixture before forming a melt or body. In another embodiment, a melt may be formed from the constituent, and the vacancy-filling agent may be added to the melt. In still another embodiment, the vacancy-filling agent may be added at a plurality of different times during the process. In an embodiment, the vacancy-filling agent is a single vacancy-filling agent, and in another embodiment, the vacancy-filling agent is a plurality of vacancy-filling agents. In a further embodiment, the constituent is a single constituent (for example, the constituent may be a $LaBr_3$ powder), and the corresponding luminescent material is substantially monocrystalline $LaBr_3$, and in another further embodiment, the constituent is a plurality of constituents. The number of vacancy-filling agents and the number of constituents, and the timing regarding when the vacancy-filling agent and constituent or melt are combined can be tailored to the needs or desires for a particular application.

The selection of the vacancy-filling agent can depend on the luminescent material being formed. Any material that can emit light in response to electromagnetic radiation, an ion beam or pulse, or an electron beam or pulse may be used. The vacancy-filling agent can have a more significant impact on materials having relatively lower diffusion coefficients, relatively higher densities, relatively greater likelihood of form a vacancy, or the like, as compared to materials having relatively higher diffusion coefficients, relatively lower densities, relatively less likelihood of form a vacancy, or the like. In general, rare earth compounds, particularly those with more, rather than fewer, atoms in a molecule may significantly benefit by the use of vacancy-filling agents.

The luminescent compound can be an oxygen-containing compound. In embodiment, an exemplary compound includes $Ba_2MgSi_2O_7$, $Ba_2Si_3O_8$, $Ba_2SiO$, $Ba_2ZnSi_2O_7$, $Ba_5Si_8O_{21}$, $BaSi_2O_5$, $BaSiO_3$, $Gd_2Si_2O_7$, $Li_2CaSiO_4$, $Lu_{(2-2x)}Gd_{(2x)}SiO_5$, $Lu_{(2-2x)}Y_{2x}SiO_5$, $Lu_2Si_2O_7$, $MgSr_2Si_2O_7$, $NaLaSiO_4$, $Y_2SiO_5$, or the like, wherein each of x, y, and z can range from 0 to 1. In a further embodiment, an exemplary compound can include $BaAl_{10}MgO_{17}$, $BaAl_{12}O_{19}$, $BaHfO_3$, $CaHfO_3$, $Gd_2O_3$, $Gd_3Sc_2Al_3O_{12}$, $Gd_3Y_3Al_{10}O_{24}$, $La_2O_3$, $LaAlO_3$, $SrHfO_3$, $YAlO_3$, $Lu_{(1-x)}Y_xAlO_3$, $(Lu_{(1-x-z)}Gd_xY_z)_3(Al_{(1-y)}Ga_y)_5O_{12}$, or the like, wherein each of x, y, and z can range from 0 to 1. In another embodiment, an exemplary compound includes $Ba_2B_5O_9Cl$, $Ba_2Ca(BO_3)_2$, $Ba_3Gd(BO_3)_3$, $Ca_4YO(BO_3)_3$, $CaLaB_7O_{13}$, $CaYBO_4$, $GdB_3O_6$, $GdBO_3$, $LaB_3O_6$, $LaBO_3$, $LaMgB_5O_{10}$, $Li_6Gd(BO_3)_3$, $Li_6Y(BO_3)_3$, $LuBO_3$, $ScBO_3$, $YAl_3B_4O_{12}$, $YBO_3$, or the like. In a further embodiment, an exemplary compound includes $AgGd(PO_3)_4$, $Ba_2P_2O_7$, $Ba_3(PO_4)_2$, $Ba_3B(PO_4)_3$, $Ba_3P_4O_{13}$, $Ba_5(PO_4)_3F$, $BaKPO_4$, $BaP_2O_6$, $Ca_5(PO_4)_3F$, $CaBPO_5$, $CeP_5O_{14}$, $CsGd(PO_3)_4$, $CsLuP_2O_7$, $CsYP_2O_7$, $K_3Lu(PO_4)_2$, $KGd(PO_3)_4$, $LuP_2O_7$, $KYP_2O_7$, $LiCaPO_4$, $LiGd(PO_3)_4$, $LuPO_4$, $NaBaPO_4$, $NaGd(PO_3)_4$, $NaLuP_2O_7$, $RbLuP_2O_7$, $RbYP_2O_7$, $Sr_5(PO_4)_3F$, or the like. Each of the foregoing compounds may include a rare earth dopant that is not provided with the chemical formula.

The luminescent compound can be a halogen-containing compound. In an embodiment, an exemplary compound includes $Ba_2GdCl_7$, $Ba_2YCl_7$, $BaBr_2$, $BaBrI$, $BaCl_2$, $BaF_2$, $BaGdCl_5$, $BaI_2$, $BaY_2F_8$, $BiF_3$, $CaF_2$, $CaI_2$, $Cs_2LiCeCl_6$, $Cs_2LiLuCl_6$, $Cs_2LiYBr_6$, $Cs_2LiYCl_6$, $Cs_2NaLaBr_6$, $Cs_2NaLuBr_6$, $Cs_2NaYBr_6$, $Cs_3CeCl_6$, $Cs_3Gd_2I_9$, $Cs_3LaBr_6$, $Cs_3Lu_2I_9$, $Cs_3LuI_6$, $CsBa_2I_5$, $CsCe_2Cl_7$, $CsGd_2F_7$, $CsI$, $CsY_2F_7$, $GdBr_3$, $GdCl_3$, $K_2CeBr_5$, $K_2LaCl_5$, $K_2YF_5$, $KLu_2F_7$, $KLuF_4$, $KYF_4$, $La_{(1-x)}Ce_xBr_3$, $LaCeF_6$, $La_{(1-x)}Ce_xCl_3$, $LaF_3$, $LaI_3$, $Li_3YCl_6$, $LiI$, $Lu_{(1-x)}Gd_xI_3$, $Lu_{(1-x)}Y_xI_3$, $LuBr_3$, $LuCl_3$, $LuI_3$, $PbCl_2$, $PrBr_3$, $PrF_3$, $Rb_2CeBr_5$, $LiCaAlF_6$, $Rb_2LiYBr_6$, $RbGd_2Br_7$, $SrBr_2$, $SrF_2$, $SrI_2$, $YCl_3$, or the like, wherein x can range from 0 to 1.

The luminescent compound can be a sulfur-containing compound. In an embodiment, an exemplary compound includes $Gd_2S_3$, $Lu_2S_3$, or the like.

The luminescent compound can include more than one anion, such as a metal oxyhalide, a metal oxysulfide, or the like, that may produce a vacancy. In an embodiment, an exemplary embodiment, the luminescent compound includes $Gd_2O_2S$, $La_2O_2S$, or the like.

Each of the foregoing luminescent compounds may include a rare earth dopant that is not provided with the chemical formula. The rare earth dopant may be in a single valance state (for example, $RE^{3+}$) or a mixture of valance states (for example, $RE^{3+}/RE^{4+}$ or $RE^{2+}/RE^{3+}$).

Many luminescent materials are disclosed herein and are to illustrate, and not limit, luminescent materials that can be used. After reading this specification, skilled artisans will appreciate that other luminescent materials may be used, wherein such other luminescent materials include a rare earth element as a principal constituent or as a dopant.

After the luminescent material is determined, the selection of vacancy-filling agent can be determined based on an anion within the luminescent compound and the formation technique. The anion can be O, S, X, wherein X is a halogen, or a combination thereof, such as an oxysulfide or an oxyhalide. Vacancy-filling agents for melt processes are addressed before vacancy-filling agents for sintering processes.

In an embodiment, a luminescent material includes an oxygen-containing compound, such as a metal-silicon-oxygen compound, a metal-boron-oxygen compound, a metal-aluminum-oxygen compound, a metal-phosphorus-oxygen compound, a metal-oxygen-sulfur compound, a metal-oxygen-halogen compound, or the like. In a particular embodiment, the metal element in such compounds may be a rare earth element. A vacancy-filling-agent can include a metal oxide. In a more particular embodiment, the vacancy-filling agent can be BaO or under the form of barium peroxide $BaO_2$ (decomposes to BaO and $O_2$ at 450° C.), $SnO_2$, $ZnO$, or any combination thereof. Barium has a boiling point of approximately 1870° C., and BaO has a boiling point of approximately 2000° C. Tin has a boiling point of approximately 2600° C., and $SnO_2$ has a sublimation point of approximately 1900° C. Zinc has a boiling point of approximately 907° C., and ZnO decomposes at a temperature of approximately 1975° C. Such oxides may be useful when the luminescent material includes a rare earth-oxygen containing compound, such as a rare earth silicate, a rare earth aluminate perovskite, a rare earth aluminum garnet, or the like. Such rare earth-oxygen compounds can have a melting point in a range of approximately 1800° C. to approximately 2200° C.

In another embodiment, a luminescent material includes a halogen-containing compound, such as a metal halide, a metal-oxygen-halogen compound, or the like. In a particular embodiment, the metal element in such compounds may be a rare earth element. A vacancy-filling-agent can include a metal or ammonium halide. In a more particular embodiment, the vacancy-filling agent can be $ZnX_2$, $ZrX_4$, $HfX_4$, $NH_4X$, $SnX_2$, or any combination thereof, wherein X is a halide. For example, the vacancy-filling agent can be a metal bromide, such as $ZnBr_2$, $ZrBr_4$, or $HfBr_4$. Zinc has a boiling point of approximately 907° C., and $ZnBr_2$ has a boiling point of approximately 650° C. Zirconium has a boiling point of approximately 4377° C., and $ZrBr_4$ has a sublimation point of approximately 375° C. Hafnium has a boiling point of approximately 4602° C., and $HfBr_4$ has a sublimation point of approximately 420° C. $NH_4Br$ and $NH_4I$ have sublimation points of approximately 452° C. and approximately 551° C., respectively. Such halides may be useful when the luminescent material includes a rare earth-halogen containing compound, such as a rare earth halide, a rare earth oxyhalide, or the like. Such rare earth-halogen compounds can have a melting point in a range of approximately 500° C. to approximately 1000° C.

In a further embodiment, a luminescent material includes a sulfur-containing compound, such as a metal sulfide compound, a metal-oxygen-sulfur compound, or the like. In a particular embodiment, the metal element in such compounds may be a rare earth element. A vacancy-filling-agent can include a metal sulfide or sulfur. In a more particular embodiment, the vacancy-filling agent can be CdS, $PbS_2$, S, or any combination thereof. Cadmium has a boiling point of approximately 765° C., and CdS has a sublimation point of approximately 980° C. Lead has a boiling point of approximately 1740° C., and PbS has a boiling point of 1280° C. Sulfur has a boiling point of approximately 445° C. Such sulfur-containing materials may be useful when the luminescent material includes a rare earth-sulfur containing compound, such as a rare earth sulfide, a rare earth oxysulfide, or the like.

A luminescent material may be formed using a sintering technique. Sintering may be performed at atmospheric pressure or at a pressure significantly higher than atmospheric pressure. A compound typically has a higher vaporization temperature as the pressure increases. The selection of vacancy-filling agents will depend on the temperatures and pressures to which the body will be exposed. In an embodiment, many of the previously described vacancy-filling agents may be used, and in another embodiment, other vacancy-filling agents, such as those described below may be used. In still another embodiment, yet other vacancy-filling agents may be used. After reading this specification, skilled artisans will be able to select a vacancy-filling agent for a particular process to form a ceramic body of the luminescent material.

After selecting the constituent and the vacancy-filling agent, the processing sequence can depend on the particular process (melt-based or sintering process) and the particular luminescent material formed.

In an embodiment, powders of the constituent and the vacancy-filling agent can be mixed to form a mixture. The constituent can be one or more oxides, halides, sulfides, or a combination therefore. For example, a cerium-doped lutetium aluminum garnet, the constituents can include $CeO_2$, $Lu_2O_3$, and $Al_2O_3$. The vacancy-filling agent can include BaO (or under the form of $BaO_2$), $SnO_2$, ZnO (or under the form of $ZnO_2$), or any combination thereof. A cerium-doped lanthanum bromide can have constituents including $CeBr_3$ and $LaBr_3$. The vacancy-filling agent can include $ZnBr_2$, $ZrBr_4$, $HfBr_4$, $NH_4X$, $SnBr_2$, or any combination thereof. A europium-doped gadolinium oxysulfide can have constituents including $Eu_2O_2S$ and $Gd_2O_2S$. The vacancy-filling agent can include CdS, $PbS_2$, S, or any combination thereof. Between the constituents, skilled artisans are able to determine the proper amount of constituents to use for the particular luminescent compound to be formed.

In a particular melt-based process, the mixture of the powders can be put into a crucible. In an alternative embodiment, the powders can be initially mixed within the crucible. The crucible and mixed powders are heated. The heating sequence and time may depend on whether the vaporization temperature of the vacancy-filling agent is above or below the melting temperature of the luminescent material and how close the vaporization and melting temperatures are to each other. At least part of the heating sequence can help the vacancy-filling agent produce vacancy-filling atoms to reduce the likelihood of forming vacancies within the luminescent compound of the luminescent material. If other atoms are present in the vacancy-filling agent, such other atoms may be removed as a vapor, such as Zn or Sn. For such a vacancy-filling agent, substantially none of the other atoms may be incorporated within the luminescent material, and in particular the matrix of the luminescent compound. In another embodiment, some of the other atoms may not completely be removed as a vapor, such as Ba, and may be present within the luminescent material; however such atoms may be present at interstitial sites and substantially none may be incorporated within the matrix of the luminescent compound. Whether the other atoms will be removed as a vapor or within the luminescent material can depend on the particular combination of vacancy-filling agent and luminescent compound.

In an embodiment, the vaporization temperature of the vacancy-filling agent is at least approximately 5° C., at least approximately 11° C., at least approximately 20° C., at least approximately 50° C., or at least 105° C. lower than the melting temperature of the luminescent compound. If the vaporization temperature is less than and within approximately 80° C. of the melting temperature, the mixture may be taking to the melting temperature of the luminescent compound without any special precautions. If the vaporization temperature is more than approximately 100° C. away from the melting temperature, the mixture may be taken to approximately the vaporization temperature of the vacancy-filling material, and the mixture may be maintained at such temperature for a time period of at least approximately 1.1 minutes, at least approximately 5 minutes, at least approximately 11 minutes, at least approximately 15 minutes, or at least approximately 20 minutes before taking the mixture to another temperature closer to the melting temperature of the luminescent material. Such a heating operation may help keep the vacancy-filling agent from volatilizing at too high of a rate, which may cause the mixture to escape the crucible.

The mixture can then be taking to another temperature closer to the melting temperature of the luminescent material.

In another embodiment, the vaporization temperature of the vacancy-filling agent is above the melting temperature of the luminescent compound. In a particular embodiment, the vaporization temperature is at least approximately 5° C., at least approximately 11° C., at least approximately 20° C., at least approximately 50° C., or at least 105° C. higher than the melting temperature. The process can include heating the mixture comprises heating the mixture to at least to the vaporization temperature of the vacancy-filling agent. The mixture can be at the vaporization temperature or higher for a time period of at least approximately 1.1 minutes, at least approximately 5 minutes, at least approximately 11 minutes, at least approximately 15 minutes, or at least approximately 20 minutes. After heating the mixture, the process can further include cooling the mixture to another temperature closer to the melting temperature of the luminescent compound.

In any of the foregoing embodiments, the mixture can be maintained near or above the melting temperature of the luminescent material for a time period of at least approximately 1.1 minutes, at least approximately 5 minutes, at least approximately 11 minutes, at least approximately 15 minutes, or at least approximately 20 minutes. The constituents of the luminescent compound may react with each other, dope a matrix of the luminescent compound.

In another embodiment, vacancy-filling agent may form a separate phrase if exposed to a constituent or the luminescent compound at a particular temperature or for too long of a time. For example, a cerium-doped lutetium yttrium orthosilicate can have constituents that include $CeO_2$, $Lu_2O_3$, $Y_2O_3$, and $SiO_2$. The vacancy-filling agent can include $BaO$, $SnO_2$, $ZnO$, or any combination thereof. A separate phase may form if the constituents and vacancy-filling agent are mixed at approximately room temperature and then heated to the melting point of the cerium-doped lutetium yttrium orthosilicate. To reduce the likelihood of forming a separate phase, a melt can be formed from a mixture of the constituents. The vacancy-filling agent can be added to the melt. Other combinations of luminescent compounds and vacancy-filling agents may be similarly affected, and the vacancy-filling agent may be added at a time after the constituents are mixed and initially heated.

In a further embodiment, a sintering process may be used. The constituent for the luminescent compound and vacancy filling agent may be in the form of powders and mixed as previously described. A binder may be added to help in the formation of the body; however, the binder may not be required. The combination of the powders and binder can be formed into the shape of a body. If no binder is used, the powders may be placed into a container that defines the shape of the body. Alternatively, the powders may be pressed into the shape of the body.

The body may be placed into a sintering apparatus. If a binder is present in the body, the binder may be burned out at a temperature less than 500° C., such as in a range of approximately 200° C. to 300° C. The burning out may be performed at approximately atmospheric pressure in an oxidizing ambient. Other conditions may be used to remove the binder. Clearly, the binder burnout can be omitted if no binder is present.

The sintering apparatus can be used to heat the body to the sintering temperature or a temperature closer to the sintering temperature. The pressure within the apparatus is at or may be taken to a pressure in a range of atmospheric pressure to the sintering pressure. The pressure can be selected such that the vacancy-filling agent has a vaporization temperature at such pressure is no more than approximately 250° C. lower than the sintering temperature. In a particular embodiment, the vaporization temperature of the vacancy-filling agent at the pressure is at least approximately 5° C., at least approximately 11° C., at least approximately 20° C., at least approximately 50° C., or at least 105° C. lower than the sintering temperature. In a particular embodiment, the vaporization temperature at the pressure may be approximately the sintering temperature. The vacancy-filling agent may sublime or decompose without adversely affecting the body (for example, fracturing or breaking the body). The temperature and pressure may be maintained for a time period of at least approximately 1.1 minutes, at least approximately 5 minutes, at least approximately 11 minutes, at least approximately 15 minutes, or at least approximately 20 minutes. The same or other conditions may be used for a different luminescent compound or another vacancy-filling agent is used. The sublimation or decomposition of the vacancy-filling agent should be controlled so that the body is not damaged during the sublimation or decomposition. The body may then be taken to the sintering pressure to complete formation of the luminescent material in the form of a ceramic body.

In another embodiment, the luminescent material can be in the form of a single crystal or as a polycrystalline material. The luminescent material in the form of a single crystal may be formed using a fusion zone technique, a Czochralski, a Bridgman, or an edge defined film-fed growth (EFG) technique. With the fusion zone technique, a solid material can be processed such that a crystal seed is in contact with one end of the solid, and a heat source causes a local region (portion of the solid) to become molten near the crystal. For example, for LYSO, the temperature of the ambient near the molten material may be at least approximately 1600° C. or least 1800° C., and may be no greater than approximately 2200° C., or no greater than approximately 2100° C. As the heat source moves away from the crystal, the molten portion becomes monocrystalline, and a new local region farther from the seed crystal becomes molten. The process is continued until the rest of the solid has become crystallized. The solid can be oriented in a vertical or horizontal direction during the process. The particular crystal growth methods, such as melting zone and floating zone, belong to a general notation known as fusion zone technique. The fusion zone technique may be able to incorporate a higher level of dopant than the Czochralski or Bridgman growth techniques, as volatilization or segregation of species may limit the ability of how much dopant will be in the crystal.

The luminescent material can be in the form of a polycrystalline material. Such materials can be formed using calcining, pressing, sintering, or any combination thereof. In an embodiment, a polycrystalline powder (obtained by hydrothermal method or by precipitation in alkaline solution or by vapor phase), the powder possibly being compacted with or without the use of a binder or thermally densified or assembled by a sol-gel method. In a further embodiment, the compound can be a monocrystalline or polycrystalline fiber (obtained by micro-pulling down or by EFG), or thin film (obtained by CVD), or a polycrystalline glass-ceramic. The luminescent material may be incorporated in a host material that may be transparent, such as a glass or a plastic or a liquid or a crystal. The host material may be used to excite indirectly the luminescent material.

The luminescent material may be subsequently annealed after the luminescent material is reacted or a substantially monocrystalline or polycrystalline material is formed. In an embodiment, the temperature for the anneal may be at least approximately 1100° C. or at least approximately 1200° C., and may be at no greater than approximately 1600° C. or no greater than approximately 1500° C.

In an embodiment, the formation of the luminescent material or an optional subsequent anneal may be performed in an ambient that may help to reduce the likelihood of forming vacancies. In an embodiment, the luminescent material is an oxygen-containing compound, and an oxidizing ambient may be used. In another embodiment, the luminescent material is a halogen-containing compound, and a halogen-containing ambient may be used. In still another embodiment, the luminescent material is a sulfur-containing compound, and a sulfur-containing ambient may be used.

An oxidizing ambient may be used during the formation of the luminescent material or during a subsequent anneal. The oxidizing ambient may include a species that is different from the vacancy-filling agent. The oxidizing ambient can include $O_2$, $O_3$, NO, $N_2O$, $CO_2$, or any combination thereof. On a relative basis, in an embodiment, the oxidizing ambient comprises at least approximately 1.4 volume %, at least approximately 5 volume %, at least approximately 11 volume %, at least approximately 15 volume %, or at least approximately 20 volume % of an oxidizing species that is different from the vacancy-filling agent, and in another embodiment, the oxidizing ambient includes no greater than 100 volume %, no greater than approximately 90 volume %, no greater than approximately 75 volume %, no greater than approximately 50 volume %, or no greater than approximately 40 volume % of an oxidizing species. With respect to pressure, in a further embodiment, the oxidizing ambient comprises at least approximately 1.4 kPa, at least approximately 5 kPa, at least approximately 11 kPa, at least approximately 15 kPa, or at least approximately 20 kPa of an oxidizing species that is different from the vacancy-filling agent, and in another further embodiment, the oxidizing ambient includes no greater than 101 kPa, no greater than approximately 90 kPa, no greater than approximately 75 kPa, no greater than approximately 50 kPa, or no greater than approximately 40 kPa of an oxidizing species that is different from the vacancy-filling agent.

A halogen-containing ambient may be used during a post-formation anneal of the luminescent material. The halogen-containing ambient may include a species that is different from the vacancy-filling agent. The halogen-containing ambient can include $NH_4Cl$, $NH_4Br$, $NH_4I$, $CBr_4$, $CCl_4$, $CI_4$, $CHBr_3$, $CHCl_3$, $CHI_3$, $CH_2Br_2$, $CH_2Cl_2$, $CH_2I_2$, or any combination thereof. On a relative basis, in an embodiment, the halogen-containing ambient comprises at least approximately 1.4 volume %, at least approximately 5 volume %, at least approximately 11 volume %, at least approximately 15 volume %, or at least approximately 20 volume % of an halogen-containing species that is different from the vacancy-filling agent, and in another embodiment, the halogen-containing ambient includes no greater than 100 volume %, no greater than approximately 90 volume %, no greater than approximately 75 volume %, no greater than approximately 50 volume %, or no greater than approximately 40 volume % of an halogen-containing species. With respect to pressure, in a further embodiment, the halogen-containing ambient comprises at least approximately 1.4 kPa, at least approximately 5 kPa, at least approximately 11 kPa, at least approximately 15 kPa, or at least approximately 20 kPa of an halogen-containing species that is different from the vacancy-filling agent, and in another further embodiment, the halogen-containing ambient includes no greater than 101 kPa, no greater than approximately 90 kPa, no greater than approximately 75 kPa, no greater than approximately 50 kPa, or no greater than approximately 40 kPa of an halogen-containing species that is different from the vacancy-filling agent.

A sulfur-containing ambient may be used during the formation of the luminescent material or during a subsequent anneal. The sulfur-containing ambient may include a species that is different from the vacancy-filling agent. The sulfur-containing ambient comprises $(NH_4)_2S$, $C_6H_4S$, $H_2S$, S, or any combination thereof. On a relative basis, in an embodiment, the sulfur-containing ambient comprises at least approximately 1.4 volume %, at least approximately 5 volume %, at least approximately 11 volume %, at least approximately 15 volume %, or at least approximately 20 volume % of an sulfur-containing species that is different from the vacancy-filling agent, and in another embodiment, the sulfur-containing ambient includes no greater than 100 volume %, no greater than approximately 90 volume %, no greater than approximately 75 volume %, no greater than approximately 50 volume %, or no greater than approximately 40 volume % of an sulfur-containing species. With respect to pressure, in a further embodiment, the sulfur-containing ambient comprises at least approximately 1.4 kPa, at least approximately 5 kPa, at least approximately 11 kPa, at least approximately 15 kPa, or at least approximately 20 kPa of an sulfur-containing species that is different from the vacancy-filling agent, and in another further embodiment, the sulfur-containing ambient includes no greater than 101 kPa, no greater than approximately 90 kPa, no greater than approximately 75 kPa, no greater than approximately 50 kPa, or no greater than approximately 40 kPa of an sulfur-containing species that is different from the vacancy-filling agent.

Further processing may be performed to form a product. Such processing can include cutting, polishing, lapping and the like to form a desired shape for a particular application.

The luminescent material can be used to form a scintillator or other scintillation device useful in many apparatuses. FIG. 1 illustrates an embodiment of an apparatus 100 that includes a scintillator 122, a light guide 124, a photosensor 126, and control unit 128. The scintillator 122 can include a luminescent material as previously described. The light guide 124 is substantially transparent to scintillating light emitted by the scintillator 122. The photosensor 126 can generate electrons in response to receiving scintillating light from the scintillator 122. The photosensor 126 can be a photomultiplier, a photodiode, an avalanche diode, or the like. The scintillator 122, the light guide 124, and the photosensor 126 are optically coupled together. Although the scintillator 122, the light guide 124, and the photosensor 126 are illustrated as being spaced apart, the light guide 124 may directly contact the scintillator 122 or the photosensor 126. In another embodiment, a coupling material, such as a substantially clear silicone gel may be used to couple the scintillator 122, the light guide 124, and the photosensor 126 together. The scintillator 122, the light guide 124, and the photosensor 126 may be located inside one or more housings so that ambient light or other undesired radiation does not reach the photosensor 126. The control unit 128 is electrically coupled to the photosensor 126. During normal operation, radiation can be captured by the scintillator 122, and the scintillator 122 emits scintillating light in response to receiving the targeted radiation. The scintillating light is received by the photosensor 126 that generates an electronic signal that is transmitted to the control unit 128. The control unit 128 includes hardware, firmware, or software that is configured so that the control unit 128 can generate information regarding the targeted radiation, such as the type of radiation (x-rays, gamma-rays, beta particles, and the like), intensity of the radiation, location of where the radiation was captured or where the radiation originated, or any combination thereof.

The apparatus can be a radiation detection apparatus, such as a medical imaging apparatus, a well logging apparatus, a security inspection apparatus, or the like. In a particular embodiment, the radiation detection system can be used for gamma ray analysis, such as a Single Positron Emission Computer Tomography (SPECT) or Positron Emission Tomography (PET) analysis. In another embodiment, the luminescent material may be used for other applications outside of radiation detection. For example, the apparatus can include a luminescence emitter, especially monochromatic, for UV spectra, visible and IR, as for a wavelength conversion system, for example a laser device. In such a device, a control unit can be coupled to the scintillator 122, and the light guide 124 and photosensor 126 can be replaced by a lens or another suitable optical feature. Yet another apparatus that can use the luminescent material can include an optical data storage device.

The use of a vacancy-filling agent may allow for the elimination of annealing step for many materials in particular semiconductors, optical scintillators, laser crystals and ceramics. In particular, is the use of the vacancy-filling agent during formation may allow for a single solution to compensate the vacancies in phase metastable materials, as a lutetium aluminate perovskite (LuAP).

Further, the vacancy-filling agent may include vacancy-filling atoms and other atoms. The other atoms may be volatilized and not incorporated within luminescent material. Alternatively, the other atoms may be within the luminescent material at low levels and not be incorporated within the matrix of a luminescent compound.

Still further, the vacancy-filling agent allows vacancy-filling atoms to be incorporated into a melt or into a body before sintering, which is a more effective way to incorporate anions, such as O, S, and X, wherein X is a halogen, as compared to using an ambient including corresponding atoms of such anions. Thus, an inert ambient or an ambient that is less damaging to equipment may be used in forming the luminescent material.

Luminescent materials as described in accordance with the concepts described herein have unusually good light output, energy resolution, linearity, decay time, and afterglow properties. Linearity refers to how well a scintillation crystal approaches perfect linear proportionality between irradiation energy and light output. The linearity can be measured as a departure from perfect linearity. A scintillation crystal having perfect linearity would always create the same number of photons per unit energy absorbed, regardless of the energy of the radiation. Thus, its departure from perfect linearity is zero. In an embodiment, a luminescent material that includes a cerium-doped LYSO compound can have an afterglow of less than 200 ppm after 100 ms relative to the intensity measured during an x-ray irradiation. In a particular embodiment, an improvement with less afterglow may be accompanied by a reduction in the decay time and an increase in light yield. The presence of a rare earth element in a divalent or tetravalent state with an electronic charge compensating material can allow a luminescent material to maintain electronic charge balance, yet still achieve benefits of having the rare earth element in the divalent or tetravalent state.

In an embodiment, the presence of vacancies may be detected by a color change. The color change may be quantified by determining a color difference between a luminescent material in accordance with any of the embodiments described herein may be compared to its corresponding base material when both are illuminated by substantially white light. As used herein, a corresponding base material has a substantially the same composition as the luminescent material, except that is formed without a vacancy-filling agent. For example, a luminescent material formed in accordance to a particular embodiment described herein can include a cerium-doped lutetium orthosilicate can be formed using $CeO_2$, $Lu_2O_3$, and $SiO_2$, and ZnO as a vacancy-filling agent, and its corresponding base material is formed using $CeO_2$, $Lu_2O_3$, and $SiO_2$, but without adding any ZnO.

Samples for color change evaluation may be used as formed, have a surface polished, fractured roughed, or have another suitable sample preparation performed. White light may be directed such that it is directed perpendicular to surface, at an angle other than perpendicular to the surface, or from a plurality of light sources oriented at different angles with respect to the surface. One or more different techniques may be used to determine color change.

In an embodiment, CIE 1976 color space coordinates, $L^*$, $a^*$, and $b^*$ can be used. The CIE 1976 color space coordinates may be obtained using a Cary 6000i-brand spectrophotometer from Varian, now part of Agilent Technologies, Inc. The luminescent material reflects substantially white light at color space coordinates of $L1^*$, $a1^*$, $b1^*$ that correspond to CIE 1976 color space coordinates $L^*$, $a^*$, and $b^*$ for the luminescent material. The corresponding base material reflects substantially white light at color space coordinates of $L2^*$, $a2^*$, $b2^*$ that correspond to CIE 1976 color space coordinates $L^*$, $a^*$, and $b^*$ for the corresponding base material. The color difference between the luminescent material and the base compound may be such that $|a1^*-a2^*|$ is no greater than approximately 9, and $|b1^*-b2^*|$ is no greater than approximately 9. In another embodiment, $|a1^*-a2^*|$ is no greater than approximately 5, is no greater than approximately 3, is no greater than approximately 2, is no greater than approximately 1.5, is no greater than approximately 0.9, is no greater than approximately 0.5, or is no greater than approximately 0.2, is no greater than approximately 0.09, no greater than approximately 0.05, or no greater than approximately 0.01, and $|b1^*-b2^*|$ is no greater than approximately 5, is no greater than approximately 3, is no greater than approximately 2, is no greater than approximately 1.5, is no greater than approximately 0.9, is no greater than approximately 0.5, or is no greater than approximately 0.2, is no greater than approximately 0.09, no greater than approximately 0.05, or no greater than approximately 0.01. In a further embodiment, $|L1^*-L2^*|$ is no greater than approximately 9, no greater than approximately 5, is no greater than approximately 3, is no greater than approximately 2, is no greater than approximately 1.5, is no greater than approximately 0.9, is no greater than approximately 0.5, or is no greater than approximately 0.2.

As an alternative to color space coordinates, the wavelength of reflected light may be used. The luminescent material reflects substantially white light at a first wavelength, and its corresponding base compound reflects substantially white light at a second wavelength. In an embodiment, first and second wavelengths are no greater than approximately 50 nm from each other, no greater than approximately 30 nm, no greater than approximately 20 nm, no greater than approximately 15 nm, no greater than approximately 9 nm, no greater than approximately 5 nm, no greater than approximately 2 nm from each other.

In still another embodiment, a particular spectrum of wavelengths may be used. In one example, a luminescent material is colorless when sufficiently electronic charge balanced, and a similar scintillator compound has a yellow color if not sufficiently electronic charge balanced. The intensity of the reflected light at wavelengths from 400 nm to 700 nm for the scintillator compounds may be compared. A color change may be determined if the data significantly differ. Alternatively, only blue light (for example, light having an emission maximum at a wavelength in a range of 400 nm to 450 nm) may be used to illuminate the luminescent materials. The luminescent material that is colorless may reflect substantially more of the blue light as compared to the luminescent material that has the yellow color.

In another example, a different luminescent material has a yellow color when sufficiently electronic charge balanced, and yet another similar scintillator compound has a green color if not sufficiently electronic charge balanced. The intensity of the reflected light at wavelengths from 400 nm to 700 nm for the scintillator compounds may be compared. An analysis may be performed with different color lights. A first set of data may be obtained when, only green light (for example, light having an emission maximum at a wavelength in a range of 500 nm to 550 nm) is used to illuminate the luminescent materials. A second set of data may be obtained when, only red light (for example, light having an emission maximum at a wavelength in a range of 650 nm to 700 nm) is used to illuminate the luminescent materials. The luminescent material that is yellow may reflect substantially more of the red light and less of the green light as compared to the luminescent material that has the green color.

Further, the vacancy-filling agent can help produce a luminescent material having more homogenous functional properties throughout a sample or other body due to having fewer vacancies near a center of the sample or other body as compared to a location closer to the edge of the sample or other body. A sample or other body may be cut into smaller samples. For example, a 10×2×2 mm sample may be cut into ten 1×2×2 samples. The smaller samples may be characterized by a known thermoluminescence analysis technique after preliminary UV or X-ray irradiation. The analysis is performed in 2D space: Light Emission (LE)/Temperature (T) of the sample. When heating up slowly starting from cryogenic temperatures, the sample irradiates the portion of light at the particular temperature levels meaning de-trapping of the defect energy. The final curve LE(T) includes typically of a few number of peaks of different height corresponding to the different temperatures. These curves form a unique characterization ("signature") of the sample relative to the density and energy level of the defects in the luminescent material. The particular test or testing conditions should be the same for all samples. The LE(T) curve for the smaller sample may be a function of the position in the original sample or body. For a luminescent material formed in accordance with any of the processes as described herein will have the very close shapes of thermoluminescent curves LE(T) obtained for the different smaller samples, as compared to a corresponding base material of the luminescent material.

Many different aspects and embodiments are possible. Some of those aspects and embodiments are described herein. After reading this specification, skilled artisans will appreciate that those aspects and embodiments are only illustrative and do not limit the scope of the present invention. Additionally, those skilled in the art will understand that some embodiments that include analog circuits can be similarly implemented using digital circuits, and vice versa.

Embodiments may be in accordance with any one or more of the items as listed below.

Item 1. A process comprising:
forming a mixture of:
a constituent corresponding to a luminescent material; and
a vacancy-filling agent that includes vacancy-filling atoms; and
forming the luminescent material from the mixture, wherein the luminescent material includes at least some of the vacancy-filling atoms from the vacancy-filling agent.

Item 2. A process comprising:
melting a constituent corresponding to a luminescent material to form a melt;
adding a vacancy-filling agent into the melt; and
forming the luminescent material from the melt, wherein the luminescent material includes at least some of the vacancy-filling atoms from the vacancy-filling agent.

Item 3. The process of Item 1 or 2, wherein the vacancy-filling agent further comprises other atoms that include an element different from an element of the vacancy-filling atoms, and forming the luminescent material is performed such that substantially none of the other atoms from the vacancy-filling agent is incorporated into a matrix of the luminescent material.

Item 4. The process of Item 3, wherein to the extent any of the other atoms from the vacancy-filling agent are incorporated into the luminescent material, the any of the other atoms are incorporated substantially only at interstitial sites.

Item 5. The process of Item 1 or 2, wherein the vacancy-filling agent further comprises other atoms that include an element different from an element of the vacancy-filling atoms, and forming the luminescent material is performed such that substantially none of the other atoms from the vacancy-filling agent is incorporated into the luminescent material.

Item 6. The process of any one of Items 3 to 5, wherein the other atoms include metal atoms.

Item 7. The process of any one of Items 6, wherein the metal atoms include Ba, Sn, Zn, Zr, Hf, Cd, Pb, or any combination thereof.

Item 8. The process of any one of the preceding Items, wherein the vacancy-filling atoms are O, S, or X, wherein X is a halogen.

Item 9. The process of any one of the preceding Items, wherein the vacancy-filling agent includes $BaO_2$, $SnO_2$, $ZnO$, or any combination thereof.

Item 10. The process of any one of the preceding Items, wherein:
the vacancy-filling atoms are O; and
forming the luminescent material is performed in an oxidizing ambient.

Item 11. The process of any one of Items 1 to 8, further comprising annealing the luminescent material in an oxidizing ambient.

Item 12. The process of Item 10 or 11, wherein the oxidizing ambient comprises $O_2$, $O_3$, NO, $N_2O$, $CO_2$, or any combination thereof.

Item 13. The process of any one of Items 10 to 12, wherein the oxidizing ambient comprises at least approximately 1.4 volume %, at least approximately 5 volume %, at least approximately 11 volume %, at least approximately 15 volume %, or at least approximately 20 volume % of an oxidizing species that is different from the vacancy-filling agent.

Item 14. The process of any one of Items 10 to 13, wherein the oxidizing ambient includes no greater than 100 volume %, no greater than approximately 90 volume %, no greater than approximately 75 volume %, no greater than approximately 50 volume %, or no greater than approximately 40 volume % of an oxidizing species.

Item 15. The process of any one of Items 10 to 14, wherein the oxidizing ambient comprises at least approximately 1.4 kPa, at least approximately 5 kPa, at least approximately 11 kPa, at least approximately 15 kPa, or at least approximately 20 kPa of an oxidizing species that is different from the vacancy-filling agent.

Item 16. The process of any one of Items 10 to 15, wherein the oxidizing ambient includes no greater than 101 kPa, no greater than approximately 90 kPa, no greater than approximately 75 kPa, no greater than approximately 50 kPa, or no greater than approximately 40 kPa of an oxidizing species that is different from the vacancy-filling agent.

Item 17. The process of any one of Items 1 to 8, wherein the vacancy-filling agent includes $ZnX_2$, $ZrX_4$, $HfX_4$, $SnX_2$, or any combination thereof, wherein X is a halogen.

Item 18. The process of any one of Items 1 to 8 and 17, wherein:
the vacancy-filling atoms are X; and
the process further comprises annealing the luminescent material in a halogen-containing ambient.

Item 19. The process of Item 18, wherein the halogen-containing ambient comprises $NH_4Cl$, $NH_4Br$, $NH_4I$, $CBr_4$, $CCl_4$, $CI_4$, $CHBr_3$, $CHCl_3$, $CHI_3$, $CH_2Br_2$, $CH_2Cl_2$, $CH_2I_2$, or any combination thereof.

Item 20. The process of Item 18 or 19, wherein the halogen-containing ambient comprises at least approximately 1.4 volume %, at least approximately 5 volume %, at least approximately 11 volume %, at least approximately 15 volume %, or at least approximately 20 volume % of a halogen-containing species that is different from the vacancy-filling agent.

Item 21. The process of any one of Items 18 to 20, wherein the halogen-containing ambient includes no greater than 100 volume %, no greater than approximately 90 volume %, no greater than approximately 75 volume %, no greater than approximately 50 volume %, or no greater than approximately 40 volume % of a halogen-containing species that is different from the vacancy-filling agent.

Item 22. The process of any one of Items 18 to 21, wherein the halogen-containing ambient comprises at least approximately 1.4 kPa, at least approximately 5 kPa, at least approximately 11 kPa, at least approximately 15 kPa, or at least approximately 20 kPa of a halogen-containing species that is different from the vacancy-filling agent.

Item 23. The process of any one of Items 18 to 22, wherein the halogen-containing ambient includes no greater than 101 kPa, no greater than approximately 90 kPa, no greater than approximately 75 kPa, no greater than approximately 50 kPa, or no greater than approximately 40 kPa of a halogen-containing species that is different from the vacancy-filling agent.

Item 24. The process of any one of Items 1 to 8, wherein the vacancy-filling agent includes CdS, $PbS_2$, S, or any combination thereof.

Item 25. The process of any one of Items 1 to 8 and 24, wherein:
the vacancy-filling atoms are S; and
forming the luminescent material is performed in a sulfur-containing ambient.

Item 26. The process of any one of Items 1 to 8 and 24, further comprising annealing the luminescent material in a sulfur-containing ambient.

Item 27. The process of Item 24 or 25, wherein the sulfur-containing ambient comprises $(NH_4)_2S$, $C_6H_4S$, $H_2S$, S, or any combination thereof.

Item 28. The process of any one of Items 25 to 27, wherein the sulfur-containing ambient comprises at least approximately 1.4 volume %, at least approximately 5 volume %, at least approximately 11 volume %, at least approximately 15 volume %, or at least approximately 20 volume % of a sulfur-containing species that is different from the vacancy-filling agent.

Item 29. The process of any one of Items 25 to 28, wherein the sulfur-containing ambient includes no greater than 100 volume %, no greater than approximately 90 volume %, no greater than approximately 75 volume %, no greater than approximately 50 volume %, or no greater than approximately 40 volume % of a sulfur-containing species that is different from the vacancy-filling agent.

Item 30. The process of any one of Items 25 to 29, wherein the sulfur-containing ambient comprises at least approximately 1.4 kPa, at least approximately 5 kPa, at least approximately 11 kPa, at least approximately 15 kPa, or at least approximately 20 kPa of a sulfur-containing species that is different from the vacancy-filling agent.

Item 31. The process of any one of Items 25 to 30, wherein the sulfur-containing ambient includes no greater than 101 kPa, no greater than approximately 90 kPa, no greater than approximately 75 kPa, no greater than approximately 50 kPa, or no greater than approximately 40 kPa of a sulfur-containing species that is different from the vacancy-filling agent.

Item 32. The process of any of the preceding Items, wherein the vacancy-filling agent is at least approximately 0.0002 weight %, at least approximately 0.001 weight %, at least approximately 0.002 weight %, at least approximately 0.02 weight %, at least approximately 0.05 weight %, at least approximately 0.11 weight %, or at least approximately 0.3 weight % of a total mass of starting materials used to form the luminescent material.

Item 33. The process of any of the preceding Items, wherein the vacancy-filling agent is no greater than approximately 50 weight %, no greater than approximately 20 weight %, no greater than approximately 9 weight %, no greater than approximately 5 weight %, no greater than approximately 2 weight %, no greater than approximately 0.7 weight %, no greater than approximately 0.2 weight %, no greater than approximately 0.09 weight %, no greater than approximately 0.02, or no greater than 0.01 weight % of a total mass of starting materials used to form the luminescent material.

Item 34. The process of any one of the preceding Items, wherein the vacancy-filling agent has a vaporization temperature that is within approximately 250° C. of the melting temperature of the luminescent material.

Item 35. The process of any one of the preceding Items, wherein the vacancy-filling agent has a vaporization temperature higher than the melting temperature of the luminescent material.

Item 36. The process of Item 35, wherein the vaporization temperature of the vacancy-filling agent is at least approximately 5° C., at least approximately 11° C., at least approximately 20° C., at least approximately 50° C., or at least 105° C. higher than the melting temperature of the luminescent material.

Item 37. The process of Item 35 or 36, wherein heating the mixture comprises heating the mixture to at least the vaporization temperature of the vacancy-filling agent before forming the luminescent material.

Item 38. The process of Item 37, wherein heating the mixture to at least the vaporization temperature of the vacancy-filling agent is performed for a time period of at least approximately 1.1 minutes, at least approximately 5 minutes, at least approximately 11 minutes, at least approximately 15 minutes, or at least approximately 20 minutes.

Item 39. The process of Item 37 or 38, further comprising:
cooling the mixture to another temperature closer to the melting temperature of the luminescent material; and
maintaining the mixture at the other temperature for a time period of at least approximately 11 minutes, at least approximately 5 minutes, at least approximately 11 minutes, at least approximately 15 minutes, or at least approximately 20 minutes.

Item 40. The process of any one of Items 1 to 34, wherein the vacancy-filling agent has a vaporization temperature lower than the melting temperature of the luminescent material.

Item 41. The process of Item 40, wherein the vaporization temperature of the vacancy-filling agent is at least approximately 5° C., at least approximately 11° C., at least approximately 20° C., at least approximately 50° C., or at least 105° C. lower than the melting temperature of the luminescent material.

Item 42. The process of any one of Items 1 to 33, wherein forming the luminescent material from the mixture comprises:
  forming a body from the mixture; and
  sintering the body at a sintering temperature and a sintering pressure higher than atmospheric pressure.

Item 43. The process of Item 42, wherein sintering the body forms a ceramic body of the luminescent material.

Item 44. The process of Item 42 or 44, wherein the vacancy-filling agent has a vaporization temperature at a pressure in a range of atmospheric pressure to the sintering pressure that is no more than approximately 250° C. lower than the sintering temperature.

Item 45. The process of any one of Items 42 to 44, wherein the vaporization temperature of the vacancy-filling agent at a pressure in a range of atmospheric pressure to the sintering pressure is at least approximately 5° C., at least approximately 11° C., at least approximately 20° C., at least approximately 50° C., or at least 105° C. lower than the sintering temperature.

Item 46. The process of any one of Items 42 to 45, further comprising:
  heating the body to a first temperature at a first pressure, wherein the first temperature is approximately the vaporization temperature of the vacancy-filling agent at the first pressure;
  maintaining the body at approximately the first temperature for a time period of at least approximately 1.1 minutes, at least approximately 5 minutes, at least approximately 11 minutes, at least approximately 15 minutes, or at least approximately 20 minutes; and
  heating the body to the sintering temperature that is higher than the first temperature.

Item 47. The process of any one of the preceding Items, wherein a body of the luminescent material has a more homogeneous thermoluminescent characterization throughout the body, as compared to a substantially same size of a corresponding base material of the luminescent material, wherein the body has a dimension of at least 2 mm.

Item 48. The process of any one of the preceding Items, wherein the luminescent material is a scintillation material having an afterglow of less than 200 ppm after 20 ms relative to the intensity measured during an X-ray irradiation.

Item 49. The process of any one of the preceding Items, wherein the luminescent material, wherein the luminescent material is a scintillation material having a greater light output, a smaller value of energy resolution, a lower afterglow, a shorter decay time, or a more proportional response over a range of irradiation energies, or any combination thereof as compared to a corresponding base material of the luminescent material.

Item 50. A luminescent material, wherein a body of the luminescent material has a more homogeneous thermoluminescent characterization throughout the body, as compared to a substantially same size of a corresponding base material of the luminescent material, wherein the body has a dimension of at least 2 mm.

Item 51. A luminescent material comprises a scintillation material having a greater light output, a smaller value of energy resolution, a lower afterglow, a shorter decay time, or a more proportional response over a range of irradiation energies, or any combination thereof as compared to a corresponding base material of the luminescent material.

Item 52. The process or luminescent material of any of the preceding Items, wherein the luminescent material has a greater light output as compared to the corresponding base material.

Item 53. The process or luminescent material of any of the preceding Items, wherein the luminescent material is a scintillation material having a smaller value of energy resolution as compared to the corresponding base material.

Item 54. The process or luminescent material of any of the preceding Items, wherein the luminescent material has a lower afterglow as compared to the corresponding base material.

Item 55. The process or luminescent material of any of the preceding Items, wherein the luminescent material is a scintillation material having a shorter decay time as compared to the corresponding base material.

Item 56. The process or luminescent material of any of the preceding Items, wherein the luminescent material is a scintillation material having a more proportional response over a range of irradiation energies, as compared to the corresponding base material.

Item 57. The process or luminescent material of any one of the preceding Items, wherein the luminescent material has an afterglow of less than 200 ppm after 20 ms relative to the intensity measured during an X-ray irradiation.

Item 58. The process or luminescent material of any one of the preceding Items, wherein:
  the luminescent material is capable of reflecting substantially white light at color space coordinates of $L1*$, $a1*$, $b1*$ that correspond to CIE 1976 color space coordinates $L*$, $a*$, and $b*$ for the luminescent material;
  a corresponding base material of the luminescent material is capable of reflecting substantially white light at color space coordinates of $L2*$, $a2*$, $b2*$ that correspond to CIE 1976 color space coordinates $L*$, $a*$, and $b*$ for the corresponding base material;
  $|a1*-a2*|$ is no greater than approximately 9; and
  $|b1*-b2*|$ is no greater than approximately 9.

Item 59. The process or luminescent material of Item 58, wherein:
  $|a1*-a2*|$ is no greater than approximately 5, is no greater than approximately 3, is no greater than approximately 2, is no greater than approximately 1.5, is no greater than approximately 0.9, is no greater than approximately 0.5, is no greater than approximately 0.2, is no greater than approximately 0.09, no greater than approximately 0.05, or no greater than approximately 0.01; and
  $|b1*-b2*|$ is no greater than approximately 5, is no greater than approximately 3, is no greater than approximately 2, is no greater than approximately 1.5, is no greater than approximately 0.9, is no greater than approximately 0.5, or is no greater than approximately 0.2, is no greater than approximately 0.09, no greater than approximately 0.05, or no greater than approximately 0.01.

Item 60. The process or luminescent material of Item 58 or 59, wherein $|L1*-L2*|$ is no greater than approximately 9.

Item 61. The process or luminescent material of Item 60, wherein $|L1*-L2*|$ is no greater than approximately 5, is no greater than approximately 3, is no greater than approximately 2, is no greater than approximately 1.5, is no greater than approximately 0.9, is no greater than approximately 0.5, or is no greater than approximately 0.2.

Item 62. The process or luminescent material of any one of the preceding Items, wherein:

the luminescent material is capable of reflecting substantially white light at a first wavelength;

a corresponding base material of the luminescent material is capable of reflecting substantially white light at a second wavelength; and the first and second wavelengths are no greater than approximately 50 nm from each other.

Item 63. The process or luminescent material of Item 62, wherein the first and second wavelengths are no greater than approximately 30 nm, no greater than approximately 20 nm, no greater than approximately 15 nm, no greater than approximately 9 nm, no greater than approximately 5 nm, no greater than approximately 2 nm from each other.

Item 64. The process or luminescent material of any one of Items 1 to 16 and 32 to 63, wherein the luminescent material comprises a metal-silicon-oxygen compound.

Item 65. The process or luminescent material of any one of Items 1 to 16 and 32 to 63, wherein the luminescent material comprises a metal-boron-oxygen compound.

Item 66. The process or luminescent material of any one of Items 1 to 16 and 32 to 63, wherein the luminescent material comprises a metal-aluminum-oxygen compound, wherein the metal is different from aluminum, and the metal-aluminum-oxygen compound does not include a significant amount of silicon.

Item 67. The process or luminescent material of any one of Items 1 to 16 and 32 to 63, wherein the luminescent material comprises a metal-phosphorus-oxygen compound.

Item 68. The process or luminescent material of any one of Items 1 to 8 and 24 to 63, wherein the luminescent material comprises a metal sulfide compound.

Item 69. The process or luminescent material of any one of Items 1 to 16 and 24 to 63, wherein the luminescent material comprises a metal-oxygen-sulfur compound.

Item 70. The process or luminescent material of any one of Items 1 to 8, 15 to 23, and 32 to 63, wherein the luminescent material comprises a metal halide.

Item 71. The process or luminescent material of any one of Items 1 to 23 and 32 to 63, wherein the luminescent material comprises a metal-oxygen-halogen compound.

Item 72. The process or luminescent material of any one of the preceding Items, wherein the luminescent material is substantially monocrystalline.

Item 73. The process or luminescent material of any one of Items 1 to 71, wherein the luminescent material is a polycrystalline material.

Item 74. The process or luminescent material of any one of the preceding Items, wherein the luminescent material includes a rare earth element.

Item 75. The process or luminescent material of Item 74, wherein the rare earth element is a principal constituent of the luminescent material.

Item 76. A radiation detection apparatus comprising:

a scintillator including the luminescent material made by the process of or the luminescent material of any one of the preceding Items; and a photosensor configured to receive scintillating light from the scintillator.

Item 77. The radiation detection apparatus of Item 76, wherein the radiation detection apparatus comprises a medical imaging apparatus, a well logging apparatus, or a security inspection apparatus.

Item 78. A positron emission tomography scanner comprising the luminescent material made by the process of or the luminescent material of any one of Items 1 to 75.

Item 79. A laser device comprising the luminescent material made by the process of or the luminescent material of any one of Items 1 to 75.

Item 80. An optical data storage device comprising the luminescent material made by the process of or the luminescent material of any one of Items 1 to 75.

EXAMPLES

The concepts described herein will be further described in the Examples, which do not limit the scope of the invention described in the claims. The Examples demonstrate performance of scintillation crystals of different compositions. Numerical values as disclosed in this Examples section may be approximated or rounded off for convenience.

Example 1

Example 1 is directed to an oxide, and in particular, a LYSO:Ce material. $SnO_2$ or ZnO were added to constituents when forming a LYSO:Ce scintillation material and produce improved results in terms of scintillation light output. The $SnO_2$ or ZnO compounds were added directly to the melt together with the stoichiometric mixture of oxides forming the LYSO:Ce phase. Table 1 includes a table of LYSO materials; "ref" refers to a reference in which no $SnO_2$ or ZnO was added. The applied glow discharge mass spectrometry (GDMS) analysis did not reveal (lower than 0.1 ppm) any traces of residual Sn or Zn in all samples listed in Table 1 grown crystals or in the corresponding residual bath after growth. Nuclear characterization has been applied for $10 \times 10 \times 10$ mm$^3$ LYSO samples.

TABLE 1

| LYSO initial raw material composition | LYSO crystalline composition | Light Output ph/MeV at 662 keV | Energy resolution (%) |
| --- | --- | --- | --- |
| LYSO:Ce:Ca, ref | LYSO:Ce:Ca | 32913 | 8.6 |
| LYSO:Ce:Ca + ZnO | LYSO:Ce:Ca | 42499 | 8.2 |
| LYSO:Ce:Ca + SnO$_2$ | LYSO:Ce:Ca | 42538 | 7.2 |
| LYSO:Ce:Mg | LYSO:Ce:Mg | 34235 | 8.3 |
| LYSO:Ce:Mg + ZnO | LYSO:Ce:Mg | 41762 | 7.5 |

The data in Table 1 show unexpectedly higher light output when a vacancy-filling agent is used. For the samples having a Ca co-dopant, the vacancy-filling agent improves light output by approximately 29%, and for the samples having a Mg co-dopant, the vacancy-filling agent improves light output by approximately 22% over their respectively corresponding base compounds.

Samples were tested for afterglow. The characterization was performed by determining the light output from the samples as detected by a silicon photomultiplier (SiPM) at the wave-length in visible spectrum around 550 nm. Data was collected at 20 ms and 500 ms. The data are presented in Table 2.

TABLE 2

| Sample | Light Output, by SiPM a.u. | Afterglow at 20 ms | Afterglow at 500 ms |
|---|---|---|---|
| LYSO:Ce:Ca + ZnO, sample 1 | 784670 | 125 | 82 |
| LYSO:Ce:Ca + ZnO, sample 2 | 856750 | 141 | 91 |
| LYSO:Ce:Ca, ref | 627996 | 284 | 177 |

The data in Table 2 show unexpectedly less afterglow when a vacancy-filling agent is used. For the samples having a Ca co-dopant, the vacancy-filling agent reduces afterglow by approximately 50%, over their respectively corresponding base compounds.

Additional samples were prepared wherein the quantity of vacancy-filling agent. When 0.1 weight % of the ZnO or SnO (based on the total mass of the charge) were added into the melt, the improvement is not as significant. At 0.5 weight % of ZnO or $SnO_2$, the unexpected results, such as those in Tables 1 and 2 were achieved. At 1.0 weight % or 2.0 weight %, the results became saturated showing substantially the same characteristics as at 0.5 weight % and without a significant the improvement of scintillation parameters.

Example 2

Example 2 is directed to a halide, and in particular, a $LaBr_3$:Ce material $ZnBr_2$, $ZrBr_4$, or $HfBr_4$, were added to constituents when forming a $LaBr_3$:Ce scintillation material and produce improved results in terms of scintillation light output. The $ZnBr_2$, $ZrBr_4$, or $HfBr_4$, compounds were added directly to the melt together with the stoichiometric mixture of halide. The GDMS analysis confirmed the absence (lower than 0.1 ppm) of cationic impurities like Zn, Sn, Zr or Hf in the crystals.

TABLE 3

| $LaBr_3$:Ce initial raw material composition | $LaBr_3$:Ce crystalline composition | Light Output for 3 × 3" assembled detectors relative to NaI:Tl reference, at 662 keV (%) | Energy resolution (%) |
|---|---|---|---|
| $LaBr_3$:Ce, ref | $LaBr_3$:Ce | 220 | 3.20 |
| $LaBr_3$:Ce + $ZnBr_2$ | $LaBr_3$:Ce | 240 | 3.10 |
| $LaBr_3$:Ce + $ZrBr_4$ | $LaBr_3$:Ce | 235 | 3.15 |
| $LaBr_3$:Ce + $HfBr_4$ | $LaBr_3$:Ce | 235 | 3.15 |

The elimination for Br vacancies in situ during growth stage shows the improvement of light yield for the $LaBr_3$:Ce detectors. Similar to the oxide scintillator compounds, the halide scintillators have scintillation parameters that improve to a particular concentration, above which no significant further improvement is seen. However, for $LaBr_3$, the amount of vacancy-filling agent used can be much lower than for LYSO. At concentrations in the range of 0.001 weight % to 0.01 weight % (based on the total mass of the charge) show a continuous improvement of material electronic performance as a function of concentration of the vacancy-filling agent. Starting at 0.01% by weight the electronic performance becomes saturated and no further significant improved scintillation (luminescent) properties of the material is seen.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A process comprising:
   forming a mixture of:
      a constituent corresponding to a luminescent material; and
      a vacancy-filling agent that includes vacancy-filling atoms, wherein the vacancy-filling atoms are X, and X is a halogen;
   forming the luminescent material from the mixture, wherein the luminescent material includes at least some of the vacancy-filling atoms from the vacancy-filling agent; and
   annealing the luminescent material in a halogen-containing ambient.

2. The process of claim 1, wherein the vacancy-filling agent further comprises other atoms that include an element different from an element of the vacancy-filling atoms, and forming the luminescent material is performed such that substantially none of the other atoms from the vacancy-filling agent is incorporated into a matrix of the luminescent material.

3. The process of claim 2, wherein to the extent any of the other atoms from the vacancy-filling agent are incorporated into the luminescent material, the any of the other atoms are incorporated substantially only at interstitial sites.

4. The process of any one of claim 2, wherein the other atoms include Ba, Sn, Zn, Zr, Hf, Cd, Pb, or any combination thereof.

5. The process of claim 1, wherein the vacancy-filling agent includes $ZnX_2$, $ZrX_4$, $HfX_4$, $SnX_2$, or any combination thereof.

6. The process of claim 1, wherein the vacancy-filling agent has a vaporization temperature higher than the melting temperature of the luminescent material.

7. The process of claim 1, wherein the vacancy-filling agent has a vaporization temperature lower than the melting temperature of the luminescent material.

8. A process comprising:
melting a constituent corresponding to a luminescent material to form a melt;
adding a vacancy-filling agent into the melt; and
forming the luminescent material from the melt, wherein the luminescent material includes at least some of the vacancy-filling atoms from the vacancy-filling agent.

9. A process comprising:
forming a mixture of:
a constituent corresponding to a luminescent material; and
a vacancy-filling agent that includes vacancy-filling atoms, wherein the vacancy-filling atoms are O; and
forming the luminescent material from the mixture, wherein the luminescent material includes at least some of the vacancy-filling atoms from the vacancy-filling agent, wherein forming the luminescent material is performed in an oxidizing ambient.

10. The process of claim 9, wherein the vacancy-filling agent includes $BaO_2$, $SnO_2$, ZnO, or any combination thereof.

11. A process comprising:
forming a mixture of:
a constituent corresponding to a luminescent material; and
a vacancy-filling agent that includes vacancy-filling atoms; and
forming the luminescent material from the mixture, wherein the luminescent material includes at least some of the vacancy-filling atoms from the vacancy-filling agent, wherein the vacancy-filling agent has a vaporization temperature that is within approximately 250° C. of the melting temperature of the luminescent material.

12. The process of claim 11, wherein the vacancy-filling atoms are O, S, or X, wherein X is a halogen.

13. The process of claim 11, wherein the vacancy-filling agent includes CdS, $PbS_2$, S, or any combination thereof.

14. The process of claim 11, wherein:
the vacancy-filling atoms are S; and
forming the luminescent material is performed in a sulfur-containing ambient.

15. The process of claim 6, wherein heating the mixture comprises heating the mixture to at least the vaporization temperature of the vacancy-filling agent before forming the luminescent material.

16. The process of claim 15, wherein heating the mixture to at least the vaporization temperature of the vacancy-filling agent is performed for a time period of at least approximately 1.1 minutes.

17. The process of claim 15, further comprising:
cooling the mixture to another temperature closer to the melting temperature of the luminescent material; and
maintaining the mixture at the other temperature for a time period of at least approximately 1.1 minutes.

18. The process of claim 11, wherein forming the luminescent material from the mixture comprises:
forming a body from the mixture; and
sintering the body at a sintering temperature and a sintering pressure higher than atmospheric pressure.

19. The process of claim 18, wherein sintering the body forms a ceramic body of the luminescent material.

20. The process of claim 18, wherein the vacancy-filling agent has a vaporization temperature at a pressure in a range of atmospheric pressure to the sintering pressure that is within approximately 250° C. of the sintering temperature.

* * * * *